Patented Sept. 1, 1931

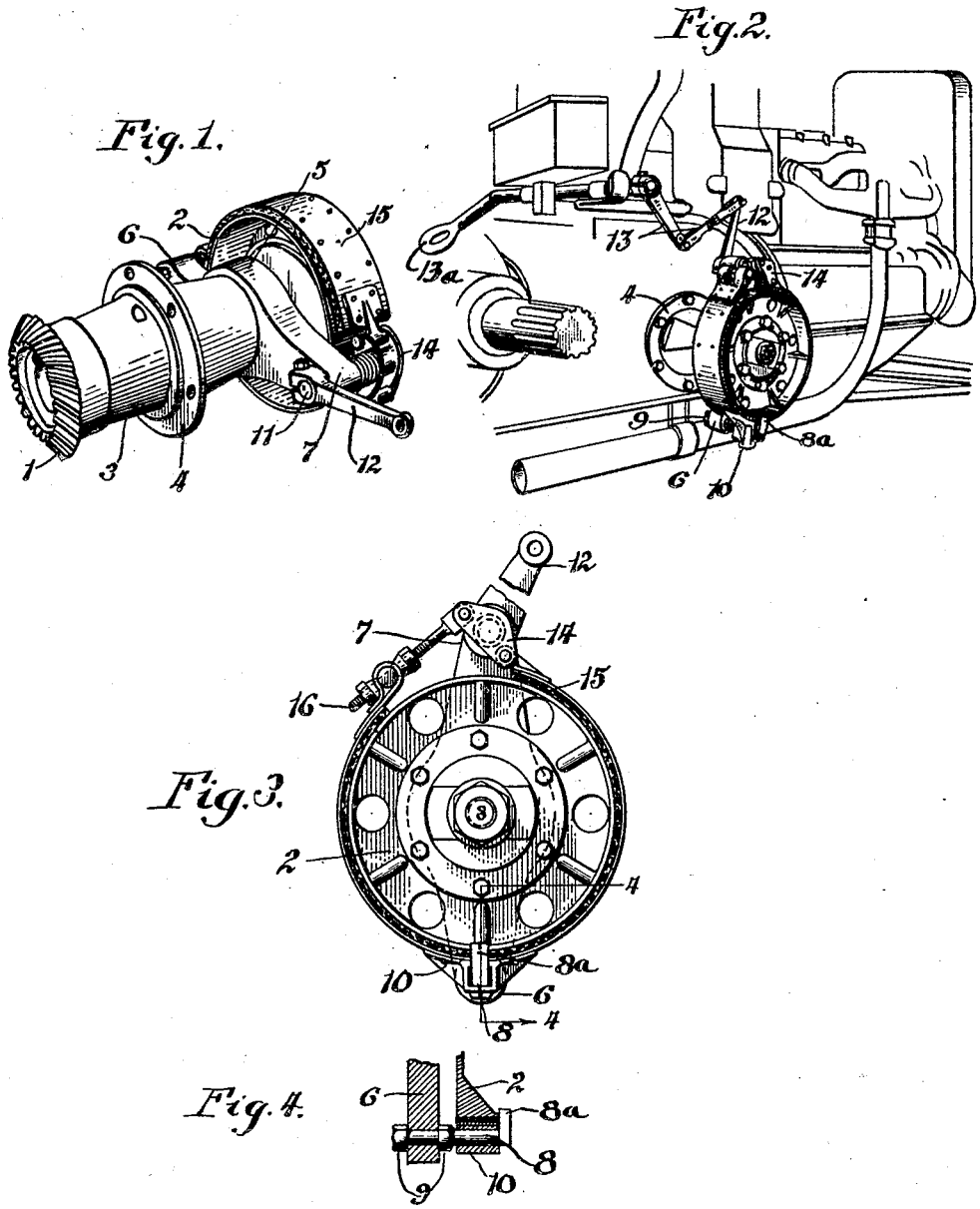

1,821,625

UNITED STATES PATENT OFFICE

JOHN T. FIGLEAR, OF BUFFALO, NEW YORK

COMBINED BRAKE AND PULLEY ATTACHMENT FOR VEHICLES

Application filed July 16, 1927. Serial No. 206,313.

This invention relates to a combined brake and pulley attachment for vehicles and is more particularly intended for use in connection with tractors such as are equipped with a power take-off shaft and means for its operative connection to the main drive shaft.

The principal objects of the invention are to provide an attachment which is available for braking and power purposes, which as a brake, is more effective than the brakes of the type heretofore used on tractors and which is easily removed, either in part or in whole, from the machine.

Pulley attachments for such tractors may be obtained at the present time. This invention contemplates the combination with such an attachment of an alternately usable brake feature.

In the accompanying drawings:

Figure 1 is a perspective view of the attachment in a position at a right angle to its normal attached position.

Figure 2 is a perspectve view of the pulley and brake end of the unit attached to the machine.

Figure 3 is an end elevation of the unit showing the brake in position on the pulley.

Figure 4 is an enlarged sectional view on the line 4—4 of Figure 3.

The usual pulley attachment includes a pulley shaft S (Fig. 3) having a gear 1 secured to its inner end and which meshes with a spiral bevel gear (not shown) on the drive shaft of the tractor. The shaft S extends transversely to the drive shaft and has a pulley 2 mounted on its outer end. Said shaft is journaled in a supporting sleeve 3 having a suitably located annular flange 4 by means of which the unit may be bolted to the machine. When it is desired to utilize the motor of the tractor for the operation of other machinery, e. g. farm machinery, the pulley attachment is fitted in position and secured by means of the flange 4. Thereupon, the tractor being at rest, a driving belt is trained over the pulley 2 and over the pulley (not shown) of the machine to be driven and in this way power for the operation of such machine is taken from the motor of the tractor.

Heretofore no use has been made of the pulley attachment except as above described. According to the present invention provision is made for the use of such attachment for normal braking purposes. This is accomplished without interfering with the use of the attachment for power take-off purposes and has been found to give superior braking effects. Thus I provide in connection with the attachment, a band brake feature which is removable and replaceable relatively to the attachment, the latter being secured in operative relation at all times and the brake feature being removed when the use of the pulley for power take-off is required.

The brake attachment operates to brake the machine by the application of braking pressure to the pulley 2. As shown this attachment includes a crosspiece 5 cast or otherwise fixed on the sleeve 3 adjacent the pulley and having opposed radial arms 6 and 7 extending beyond the rim of the pulley. The brake feature may involve a brake band 15 and in such case the lower arm 6 prevents inward displacement of said brake band from the pulley 2. The arm 6 carries a transverse outwardly extending pin 8 which is secured by nuts 9 bearing against the opposite flat faces of the arm 6. The pin 8 provides a mounting for a saddle piece or anchor 10 which is secured to the lower side of the brake band and which insures the uniform engagement of the same with the pulley 2. At its outer end the pin 8 is provided with a finger 8a which extends across the pulley rim and prevents outward displacement of the brake band from the pulley. The upper arm 7 carries a transverse rock shaft 11 to one end of which an operating arm 12 is secured, said arm being connected to the brake pedal 13a through a suitable linkage 13. The other end of shaft 11 carries a yoke or trunnion 14, one arm of which is pivotally connected to one end of the brake band 15 while the other arm is pivotally connected to a link 16, said link being adjustably and pivotally secured to the other end of the brake band. When the arm 12 is moved by the brake pedal 13a acting through linkage 13, the shaft 11 and consequently trunnion 14, is turned so as either to tighten or loosen the brake band with respect to the pulley rim in the well known manner and thus brake or release the machine, the braking pressure being transmitted as braking force to the tractor drive shaft through gear 1 and the associated gear on said drive shaft.

Should the use of the pulley be desired for power take-off purposes the brake attachment in the form herein shown must be removed. This is easily and quickly accomplished by detaching the arm 12 from shaft 11 and unscrewing the inner retaining nut 9 from pin 8, whereupon the brake band and the operating parts associated therewith may be removed as a unit from the pulley 2, leaving the latter unobstructed and available for power take-off use.

By means of this invention, a tractor is provided with a more effective braking action and the braking apparatus is made more readily accessible for observation, repair or removal. An added advantage results from having the pulley always available for use either as a braking or a power take-off element. Furthermore the structure embodying the invention is applicable to the tractor structure as originally designed and its attachment to and use in connection with the tractor structure does not require any modification of the same.

Having fully described my invention, I claim:

1. In a tractor, the combination of a transverse shaft geared to the tractor drive shaft and carrying a pulley available for power take-off use, a sleeve adapted for attachment to the tractor body and housing said transverse shaft, a brake element cooperating with said pulley and means carried by said sleeve for the operation of said brake element.

2. In a tractor, the combination of a sleeve mounted on the tractor body, a transverse shaft supported by said sleeve, said shaft being geared at one end and having a pulley mounted on its opposite end, a crosspiece mounted on said sleeve, a band brake supported by said crosspiece and having its frictional element substantially encircling said pulley and adapted to engage the same to brake the tractor.

3. In a tractor, the combination of a sleeve mounted on the tractor body, a transverse shaft supported by said sleeve, said shaft being geared at one end and having a pulley mounted on its opposite end, a crosspiece mounted on said sleeve, a band brake supported by said crosspiece and having its frictional element substantially encircling said pulley and adapted to engage the same to brake the tractor and means to prevent the frictional element of the brake from slipping off the pulley during braking operation.

4. An attachment for a tractor comprising a sleeve adapted to be attached to the body of the tractor, a shaft journalled in said sleeve and geared at its inner end to the drive shaft of said tractor and carrying on its outer end a pulley available for power take-off use, a brake element cooperating with said pulley, and means carried by said sleeve for the operation of said brake element.

5. In a tractor, the combination of a sleeve mounted on the tractor body, a transverse shaft supported in said sleeve, said shaft being geared at one end and having a pulley mounted on its opposite end, a cross piece mounted on said sleeve and a member supported by said cross piece and adapted to frictionally engage said pulley to brake the tractor.

In testimony whereof I affix my signature.

JOHN T. FIGLEAR.